US006120168A

United States Patent [19]

Brummel et al.

[11] Patent Number: 6,120,168

[45] Date of Patent: Sep. 19, 2000

[54] VEHICLE BEAM LAMP

[75] Inventors: Reinhold Brummel, Anroechte; Thomas Hilsenbeck, Erwitte; Pietro Antonio Mazziotti; Klaus Mohsakowski, both of Lippstadt, all of Germany

[73] Assignee: Hella KG Hueck & Co., Lippstadt, Germany

[21] Appl. No.: 09/104,973

[22] Filed: Jun. 26, 1998

[30] Foreign Application Priority Data

Jul. 3, 1997 [DE] Germany ........................... 197 28 446

[51] Int. Cl.[7] ........................................................ B60Q 1/00

[52] U.S. Cl. .......................... 362/507; 362/487; 362/546; 362/459

[58] Field of Search ..................................... 362/459, 487, 362/506, 507, 546, 549, 362, 363, 473–475, 477

[56] References Cited

U.S. PATENT DOCUMENTS 4,922,398 5/1990 Muto ....................................... 302/296

5,597,232 1/1997 Ohashi et al. .......................... 362/265

FOREIGN PATENT DOCUMENTS 40 01 967 C1 5/1991 Germany .

41 28 534 C1 2/1993 Germany .

*Primary Examiner*—Sandra O'Shea

*Assistant Examiner*—Ismael Negron

[57] ABSTRACT

A vehicle beam lamp, particularly an additional automobile headlight, comprising a housing, a reflector, a cover plate connected to the reflector, and a frame for fastening the cover plate and reflector to the housing, has the reflector, cover plate, and frame firmly connected to each other to form an insert that closes off the housing. A procedure for mounting a vehicle beam lamp comprising a housing, a reflector, a cover plate, and a frame connecting the reflector and cover plate to the housing involves gluing the reflector, the cover plate, and the frame together into an insert that is separably connected to the housing.

4 Claims, 4 Drawing Sheets

VEHICLE BEAM LAMP

BACKGROUND OF THE INVENTION

This invention relates to a vehicle beam lamp, particularly an additional automobile headlamp, of a type comprising a housing, a reflector, a cover plate connected to the reflector, and a frame for fastening the cover plate and reflector to the housing.

This invention further relates to a procedure for mounting such a vehicle beam lamp, comprising the housing, the reflector, the cover plate, and the frame connecting the reflector and cover plate, to the housing.

Each of German patent documents DE 40 01 967 C1 and DE 41 28 534 C1 discloses a vehicle beam lamp wherein a reflector and cover plate are glued together. A frame is slipped over the cover plate, which cover plate must have an edge bent outward as a stop surface. The frame and cover plate with the reflector are then mounted onto the housing, with the frame being screwed to the housing. On the one hand, a relatively wide frame, transverse to an optical axis, is needed for this purpose, and on the other hand, when a bulb located in the reflector is being changed, the cover plate can slip out of the frame and become damaged.

It is therefore an object of this invention to provide such a vehicle beam lamp with the frame having only a narrow visible front surface, transverse to the optical axis, and being easily and securely mountable.

A disadvantage of known procedures for mounting such a known vehicle beam lamp is that the reflector, with the cover plate glued to the reflector, and the frame that connects the reflector and cover plate to the housing, must be mounted on the housing as separate parts or parts only loosely connected together, and then be releasably connected to it. The disadvantage of this is that each of the reflector, with the cover plate, and the frame must be aligned with respect to the housing. Furthermore, the parts must be aligned every time a bulb is changed.

Therefore it is a further object of this invention to improve the procedure so that it can be performed more simply and more inexpensively.

SUMMARY OF THE INVENTION

According to principles of this invention a reflector, a cover plate, and a frame are firmly connected together, forming an insert that closes off a housing. By firmly connecting the reflector, cover plate, and frame, the cover plate with reflector advantageously cannot slip out of the frame during mounting or when a bulb is being changed. Easy mounting is made possible in that only a single combined insert must be inserted into the housing. Given the fixed connection of the frame and cover plate, a visible edge of the frame that runs transverse to the optical axis can be kept very narrow, while maintaining stability.

According to a preferred embodiment of the invention, an edge of the frame that runs transverse with respect to an optical axis of the vehicle beam lamp and faces the cover plate is designed to have a continuous groove that corresponds to a collar of the cover plate that faces rearwardly. The reflector has an edge that extends laterally outwardly toward the cover plate, which fits against the surrounding collar of the cover plate on the inside thereof. An outer surface of a reflector wall adjacent to the cover plate forms an adhesive bed with the inner surface of the surrounding collar facing towards the outer surface, with an inner wall defining the groove of the frame engaging in this bed and being thereby glued to the reflector and cover plate.

In this way, the reflector, cover plate, and frame can be glued together inexpensively in one continuous gluing site. Therefore a separate adhesive bed is unnecessary. Transverse with respect to the optical axis, practically only an edge of an outer wall defining the frame groove is visible.

According to further principles of the invention the reflector, the cover plate, and the frame are glued together into an insert that is separably connected to the housing.

By gluing together the reflector, cover plate, and frame, a one-part insert is achieved that must be aligned as a whole only once with respect to the housing. This makes changing lamps easier, as well.

According to another preferred embodiment of the invention, a laterally extending edge of the reflector is inserted into a surrounding collar of the cover plate. In this way, the surrounding collar of the cover plate and the area of the reflector adjacent to the surrounding collar of the cover plate form an adhesive bed, into which the adhesive is introduced, and then the frame is slid over the reflector in the direction of an exiting beam so that the groove located at the edge of the frame overlaps, or receives, the surrounding collar of the cover plate.

By gluing the cover plate, reflector, and frame at a single combined adhesive bed, a separate adhesive bed or separate adhesive process is rendered unnecessary.

BRIEF DESCRIPTION OF THE DRAWING

The invention is described and explained in more detail below using an embodiments shown in the drawings. The described and drawn features, in other embodiments of the invention, can be used individually or in preferred combinations. The foregoing and other objects, features and advantages of the invention will be apparent from the following more particular description of preferred embodiments of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
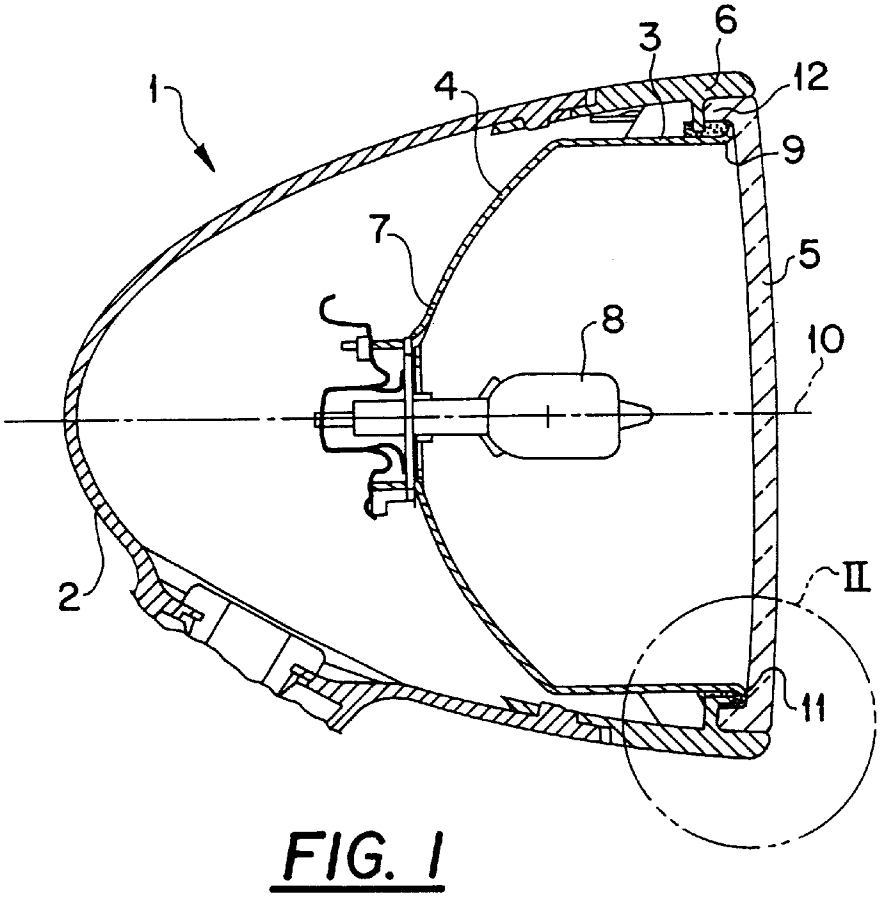
FIG. 1 is a side cross-sectional view of a vehicle beam lamp of this invention taken along line I—I in FIG. 3.
Figure 2:
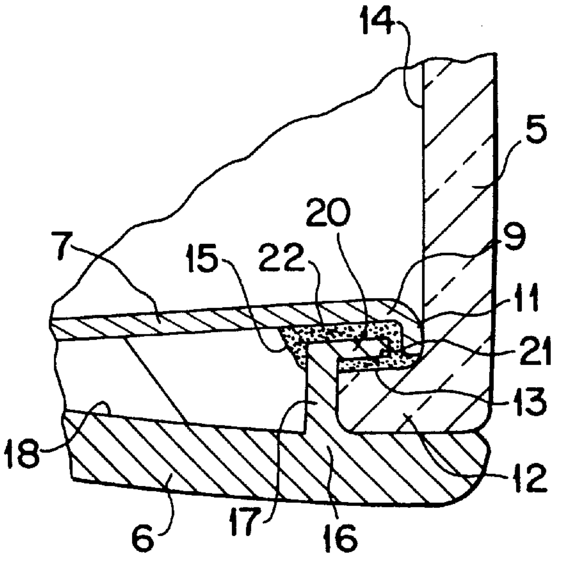
FIG. 2 is an enlarged representation of detail II in FIG. 1.
Figure 3:
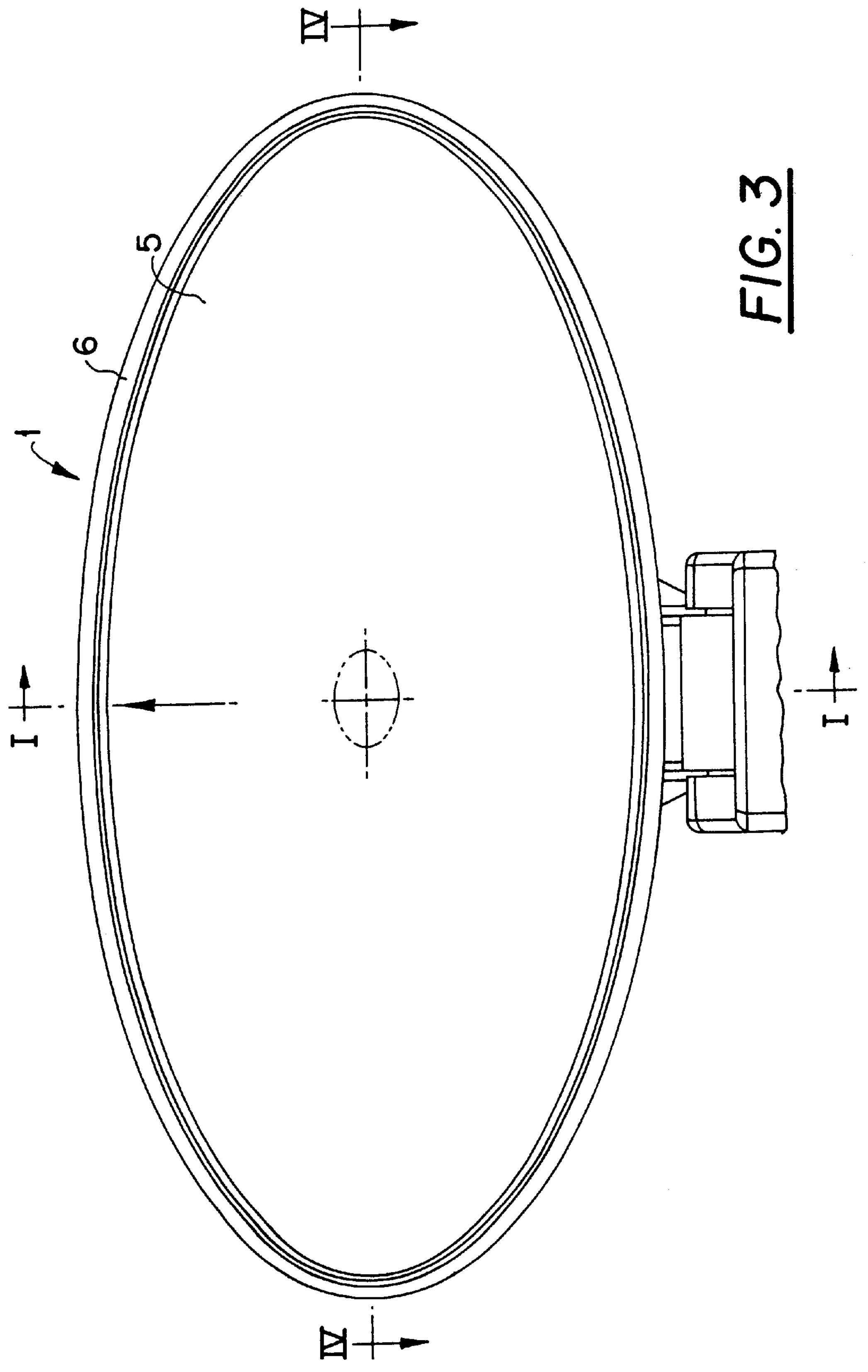
FIG. 3 is a front view of the vehicle beam lamp in FIG. 1.
Figure 4:
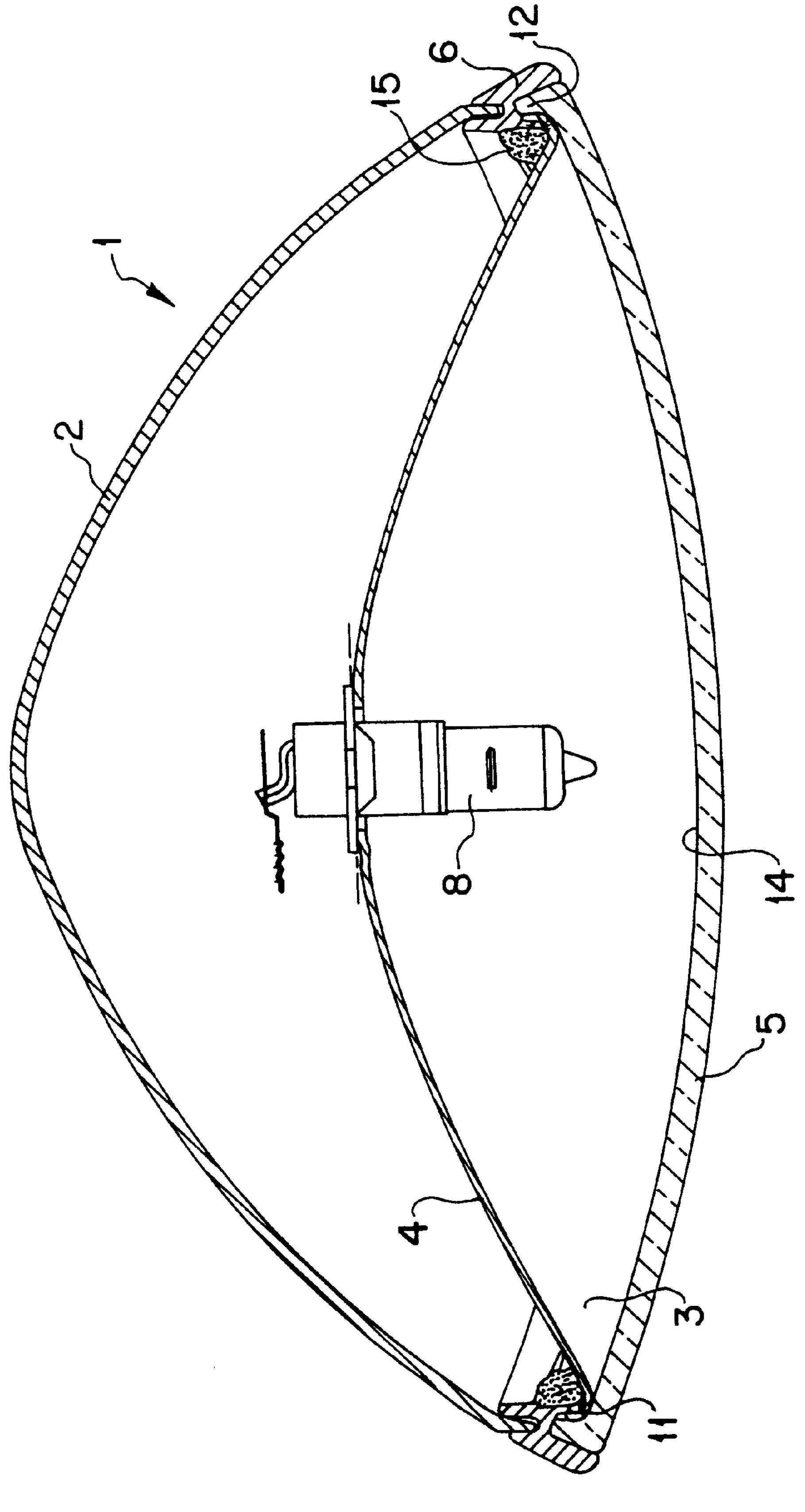
FIG. 4 is a top cross-sectional view of the vehicle beam lamp in FIG. 1 taken along line IV—IV in FIG. 3.
Figure 5:
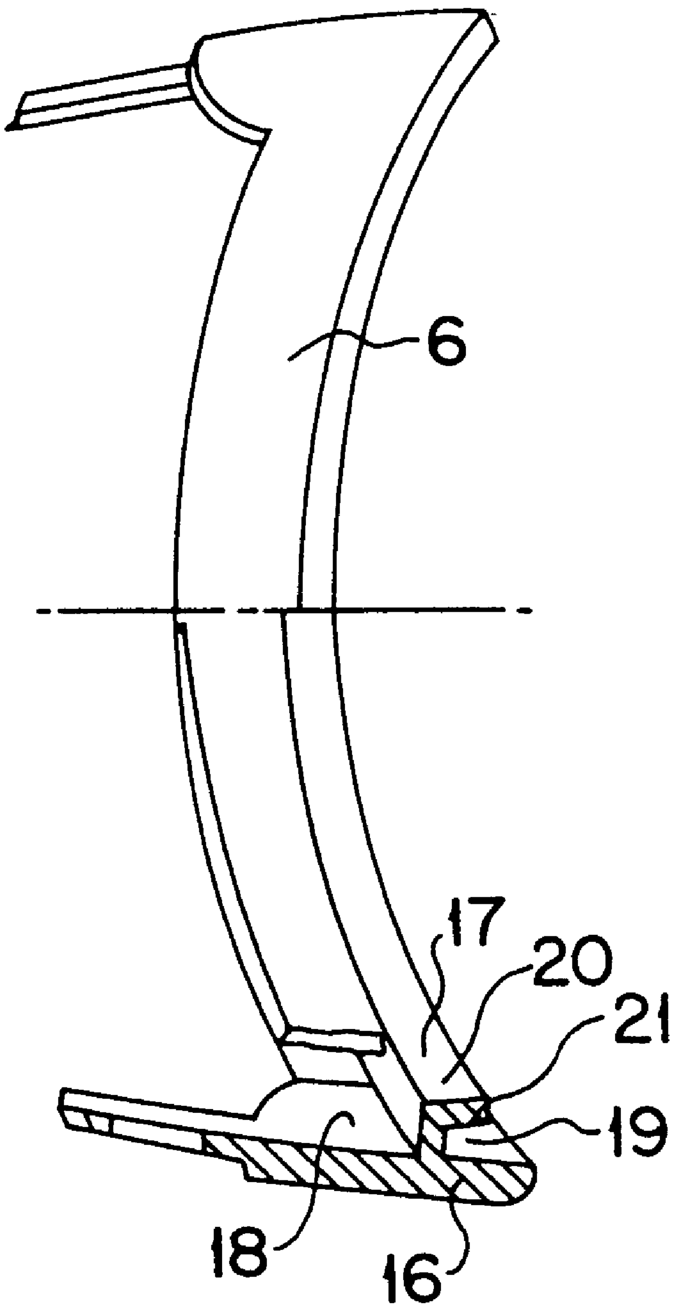
FIG. 5 is a side, partially cutaway view of a frame used in this invention.

FIG. 1 shows a vehicle beam lamp 1 comprising mainly a housing 2 and an insert 3. The insert comprises a reflector 4, a cover plate 5, and a frame 6 that are attached together.

The vehicle beam lamp 1 is designed as an additional beam lamp, and can be placed in a hanging or standing position on a motor vehicle (not shown). The housing 2 and the reflector 4 are dish shaped. The reflector 4 has a lamp 8 that can be inserted from a back of its back end 7 facing away from the cover plate 5. At its front end 9, facing toward the cover plate 5, the reflector 4 has an edge 11 extending laterally outward from an optical axis 10.

The transparent cover plate 5 has a bent collar 12 extending about the housing 2. The collar 12 has an inside surface 13 facing toward the optical axis 10 and extending approximately parallel to the optical axis 10. The collar 12 of the cover plate 5 and the extending edge 11 of the reflector 4 cooperate with each other so that the front end 9 of the reflector 4 can be set into the collar 12 in such a way that the front end 9 strikes a back surface 14 of the cover plate 5 facing toward the reflector 4 and the edge 11 of the reflector 4 strikes, or approaches, the inside surface 13 of the collar 12.

An adhesive bed 15 is formed between the inside surface 13 and an adjacent outer surface area of the front end 9 of the reflector 4.

The frame 6 has a ledge 17 at an edge 16 facing the cover plate 5 that is structured to form a continuous groove 19 on an inside 18 of the frame 6 facing the optical axis 10, which interengages the collar 12. An inner wall 20 defining the continuous groove 19, that runs approximately parallel to the optical axis 10, immerses into the adhesive bed 15, and its free end 21 lies against the laterally extending edge 11 of the reflector 4.

For mounting, the laterally extending edge 11 of the reflector 4 is set into the collar 12 of the cover plate 5. Then adhesive 22, in the form of a so-called adhesive beading is placed into the adhesive bed 15, and the frame 6 is shoved from the back end 7 of the reflector 4 over the reflector 4 so that the continuous groove 19 of the frame 6 interengages the collar 12, and the free end 21 of the inner wall 20 is supported on the laterally extending edge 11 of the reflector 4.

After the adhesive 22 sets, the insert 3 is fitted with the lamp 8, and is inserted into the housing 2.

What is claimed is:

1. A vehicle beam lamp, comprising a housing, a reflector, a cover plate connected to the reflector, and a frame (6) for fastening the cover plate and reflector to the housing, wherein the reflector, cover plate, and frame are firmly attached to each other and form an insert separate from the housing that attaches to the housing for closing off the housing; wherein the reflector, cover plate, and frame are glued together; wherein the reflector and cover plate form an adhesive bed for holding an adhesive into which a ledge (17) of the frame extends; wherein the ledge (17) of the frame (6) forms a continuous groove (19); wherein the cover plate has a surrounding collar that corresponds to the groove defined by the frame; and wherein the reflector has a laterally-extending edge that is supported on an inside of the surrounding collar.

2. A vehicle beam lamp as in claim 1, wherein the frame lies against the laterally-extending edge of the reflector.

3. Procedure for mounting a vehicle beam lamp comprising a housing, a reflector, a cover plate, and a frame connecting the reflector and cover plate to the housing, wherein the reflector, the cover plate, and the frame are glued together to form an insert (3) separate from the housing that is then separably connected to the housing; wherein the reflector is provided with a laterally extending edge, the cover plate is provided with a surrounding collar for receiving the laterally extending edge, adhesive is placed into an adhesive bed formed by the surrounding collar and an adjacent area of the reflector, and then the frame is slid in a direction of a beam of the vehicle beam lamp over the reflector, so that a groove provided at one edge of the frame engages over the surrounding collar of the cover plate.

4. Procedure as in claim 3 wherein a free end of the frame lies against the laterally extending edge of the reflector.

* * * * *